United States Patent [19]

Nakadate et al.

[11] 4,328,283

[45] May 4, 1982

[54] PHOTOGRAPHIC POLYESTER SUPPORTS SUBJECTED TO SUBBING TREATMENT

[75] Inventors: Takanori Nakadate, Hachioji; Naoto Abe; Kenichi Kitahara, both of Hino; Hironobu Nakao, Hachioji, all of Japan

[73] Assignee: Konishiroku Photo Industry Co., Ltd., Tokyo, Japan

[21] Appl. No.: 93,200

[22] Filed: Nov. 13, 1979

[30] Foreign Application Priority Data

Nov. 20, 1978 [JP] Japan .............................. 53-143063

[51] Int. Cl.[3] ........................ B32B 27/06; B05D 3/06

[52] U.S. Cl. .................................... 428/480; 427/40; 427/412.5; 428/483; 430/534; 430/536; 430/537

[58] Field of Search .............. 430/536, 537, 534, 625; 427/40, 412.5; 428/480

[56] References Cited

U.S. PATENT DOCUMENTS

| | | | |
|---|---|---|---|
| 3,539,476 | 11/1970 | Dolce et al. | 430/537 X |
| 3,711,284 | 1/1973 | Paesschen et al. | 430/537 X |
| 4,021,245 | 5/1977 | Nagatomo et al. | 430/537 |
| 4,128,426 | 12/1978 | Ohta et al. | 427/40 |
| 4,197,129 | 4/1980 | Muroi et al. | 430/625 |

FOREIGN PATENT DOCUMENTS

| | | |
|---|---|---|
| 1463943 | 2/1977 | United Kingdom . |

*Primary Examiner*—Thomas J. Herbert, Jr.
*Attorney, Agent, or Firm*—Finnegan, Henderson, Farabow, Garrett & Dunner

[57] ABSTRACT

A photographic polyester support having an adjacent subbing layer which comprises a copolymer of (1) glycidyl acrylate and/or glycidyl methacrylate and (2) hydroxylalkyl acrylate with the alkyl groups of 2–4 carbon atoms and/or hydroxyalkyl methacrylate wherein 0–67 wt % of a copolymerizable vinyl monomer may be present and the method of subbing said support with an aqueous composition of the acrylate copolymer.

9 Claims, No Drawings

PHOTOGRAPHIC POLYESTER SUPPORTS SUBJECTED TO SUBBING TREATMENT

This invention relates to photographic polyester supports subjected to subbing treatment and more particularly is concerned with photographic polyester supports subjected to subbing treatment by coating a polyester support with a specific copolymer-containing aqueous composition in order to permit a hydrophilic colloid layer, such as a photosensitive emulsion layer or a backing layer, to stick on the surface of the polyester support.

On account of excellent physical properties of being a support for light-sensitive silver halide photographic material or the like, polyester films are widely being used in recent years with increasing demand therefor. However, a practical difficulty often arises in the course of attempting to produce and maintain a strong adhesion force between a polyester support and a hydrophilic colloid layer such as a photographic gelatin layer comprising such binder as gelatin, because the polyester film is of a very strongly hydrophobic nature. In the field of light-sensitive photographic materials where polyester films are used as supports therefor, various subbing processes have heretofore been known and proposed in order to produce adhesion between the support and the hydrophilic colloid layer. In any of these known subbing processes, however, there was need of using a swelling agent or solvent for polyester film in most cases in order to permit a hydrophilic colloid layer, particularly a photographic gelatin layer, to stick strongly on the surface of polyester film. However, when subbing compositions containing such swelling agent or solvent for support are coated according to these processes on polyester films, there were observed many drawbacks such that flatness of the film support is deteriorated and, because most swelling agents or solvents of these kinds comprise harmful organic solvents, safety and hygiene of factory hands while at work are jeopardized.

On that account, recently attempts have been made in large numbers of coat polyester film supports with aqueous compositions comprising copolymers of certain kinds to form sub layers thereon. Known as the copolymers of such kind are those comprising at least one acrylic acid type monomer selected from the group consisting of esters of acrylic acid and those of methacrylic-acid, and a hydroxyl acrylate and/or hydroxyl methacrylate monomer as disclosed, for example, in Japanese Laid-Open-to-Public Publication No. 113868/1974, those comprising diolefin/vinyl monomer/hydroxy-containing monomer as disclosed, for example, in Japanese Laid-Open-to-Public Publication No. 123139/1976 or those comprising glycidylmethacrylate and ethylacrylate as disclosed in Japanese Laid-Open-to-Public Publication No. 27918/1976. In the case where a light-sensitive photographic material has been prepared by coating a silver halide photographic emulsion layer on a polyester film support subbed with a conventional copolymercontaining aqueous composition as referred to above, however, adhesion force attained between the sub layer and the emulsion layer of the photographic material in a wet state during development at elevated temperature is found to be weak in the existing circumstances.

As a technique capable of solving the above-mentioned problem of the weak adhesion force, there is a process disclosed, for example, in Japanese Laid-Open-to-Public Publication No. 11118/1974. Light-sensitive silver halide photographic materials obtained according to this process by coating a silver halide photographic emulsion layer on a polyester film support subbed with an aqueous dispersion containing an emulsified copolymer of diolefins and a compound having at least two ethyleneimino groups were found to have excellent film adhesion characteristics when they are in a wet state during development treatment and even when they are in a dry state after drying subsequent to development. However, when these light-sensitive silver halide photographic materials are intended to be processed with an automatic developing machine, there was observed such drawback that the photographic materials under development are rubbed with a transferring rack or rubber roll of the automatic developing machine to cause the so-called edge peel phonomenon where the silver halide photographic emulsion layer comes to be peeled off from the support at the edges of said photographic materials.

A process as a technique capable of overcoming the above-mentioned drawback has been proposed, as disclosed in Japanese Laid-Open-to-Public Publication No. 104913/1977, wherein a polyester film support is coated with a copolymer of glycidyl methacrylate and ethyl acrylate to form a copolymer sub layer and a gelatin layer comprising colloidal silica is then coated on the copolymer sub layer. This process, however, had such drawback that a cracking phenomenon is observed in the sub layer under drying treatment with the result that the sub layer thus formed deteriorates in its transparency. Further, this processing technique is troublesome as a subbing process in view of the necessity of forming two layers on the support, with the result that a rise in production costs was brought about.

It is accordingly a primary object of the present invention to provide subbed polyester supports for photographic use, which do not discharge harmful organic solvents, produce favorable film adhesion between a polyester support and a photographic hydrophilic colloidal layer in a dry state as well as in a wet state, and are free from edge peel.

A secondary object of the present invention is to provide subbed polyester supports for photographic use, wherein excellent film adhesion characteristics are obtained without using a swelling agent or solvent for polyester support.

A third object of the present invention is to provide subbed polyester supports for photographic use, which are excellent in film adhesion to a hydrophilic colloid layer such as a photosensitive emulsion layer or the like even in the case of application thereto of the so-called monolayer subbing technique without forming a second sub layer, and are free from edge peel.

A fourth object of the present invention is to provide subbed polyester supports for photographic use, of which the sub layer consisting of a copolymer-containing aqueous composition is excellent in transparency.

A fifth object of the present invention is to provide subbed polyester supports for photographic use, which are excellent in film adhesion characteristics relative to various photosensitive emulsion layers as well as to a backing gelatin layer.

The above-mentioned objects of the present invention and other objects thereof which will be mentioned later can be accomplished by providing a polyester support on the surface thereof with a sub layer formed by coating the support surface with a copolymer-containing aqueous composition containing a copolymer consisting essentially of (1) 30–70 wt% glycidyl acrylate and/or glycidyl methacrylate monomer, (2) 3–45 wt% hydroxyalkyl acrylate having an alkyl group of 2 to 4 carbon atoms and/or hydroxyalkyl methacrylate monomer, and (3) 0–67 wt% a copolymerizable vinyl monomer, which will be hereafter referred to the first, the second and the third component respectively.

In the present invention, a particular effect on wet film adhesion is obtained in case the mol fraction of the first component glycidyl acrylate and/or glycidyl methacrylate is greater than 30 wt%, wet film adhesion force is low in case said fraction is less than 30 wt%, and when said fraction exceeds 70 wt%, dry film adhesion force deteriorates, though the wet film adhesion is found favorable. Accordingly, the fraction of the first component should be in the range of from 30 to 70 wt%, more preferably from 35 to 65 wt%.

By the second component hydroxyalkyl acrylate having an alkyl group of 2 to 4 carbon atoms used in the present invention is meant hydroxymethyl acrylate, hydroxyethyl acrylate, hydroxypropyl acrylate and hydroxybutyl acrylate, and by hydroxyalkyl methacrylate is meant hydroxymethyl methacrylate, hydroxyethyl methacrylate, hydroxypropyl methacrylate and hydroxybutyl methacrylate. In case the fraction in the present copolymer of the hydroxyalkyl acrylate and/or hydroxyalkyl methacrylate is less than 3 wt%, dry film adhesion force is weak and, on the other hand, when said fraction exceeds 45 wt%, a copolymer latex resulting from emulsion polymerization is poor in stability, whereby polymer particles mutually coagulate and tend to precipitate. Accordingly, the fraction of the second component should be in the range of from 3 to 45 wt%, more preferably from 4 to 40 wt%. A hydroxyalkylacrylate component has been generally believed that it reacts with inter molecular glycidyl group in a latex polymer to coagulate, therefore the polymer cannot be a stable dispersion, because of the hydroxy group thereof. On the contrary, as a result of our investigation a polymer latex is quite stable in case that the polymer has specified ratio of the hydroxyalkylacrylate component and the glycidylacrylate or glycidylmethacrylate component to a total amount of the copolymer as mentioned above.

The third component of the copolymer is a copolymerizable vinyl monomer other than the first or second component which plays as its function and effect a role in improving film forming property of the copolymer-containing aqueous composition of the present invention at the time when said aqueous composition is coated on a polyester support and then dried. This third component exibits its effect as mentioned above by virtue of occupying the remainder of the copolymer from which the fractions of the first and the third components are deducted. In this case, however, when the fraction of the third component exceeds 67 wt%, the fraction of the first or second component is, as a natural consequence, out of the range as specified above in each case, whereby such deterioration in characteristics as mentioned above is brought about, and hence the fraction of the third component should be less than 67 wt%. Preferable as the copolymerizable vinyl monomer of the third component are those which are relatively stronger in hydrophobicity than the second component. Concretely, examples of preferable copolymerizable monomers used in the present invention include alkylesters of acrylic acid, styrenes, unsaturated nitriles, diolefins, vinyl acetate, vinyl chloride, vinylidene chloride. As the alkylesters of acrylic acid, there may be mentioned, for example, methyl acrylate, ethyl acrylate, n-propyl acrylate, n-butyl acrylate, sec-propyl acrylate, sec-butyl acrylate, iso-butyl acrylate, t-butyl acrylate, methyl methacrylate, ethyl methacrylate, n-propyl methacrylate, sec-propyl methacrylate, sec-butyl methacrylate, iso-butyl methacrylate, t-butyl methacrylate. The styrenes may include styrene, methyl styrene, dimethyl styrene, trimethyl styrene, diethyl styrene etc., the unsaturated nitriles include acrylonitrile, methacrylonitrile, etc., and the diolefins include butadiene, 2-chloroprene, isoprene, neoprene, 2, 3-dimethyl butadiene, etc.

These monomers mentioned above may be used either singly or in combination of two or more. Selection of appropriate monomers out of those mentioned previously is preferably made so that the resulting copolymer may have its glass transition point ranging from −30° C. to 40° C. This is because, in case the glass transition temperature of the resultant copolymer is excessively low, a polyester support subbed with an aqueous composition containing the said resultant copolymer being wound up into a roll tends to cause a sticking phenomenon between the surface of subbed support once wound up and the reverse of subbed support to be successively wound around thereon, or a sticking phenomenon between the surface of subbed support being wound up into a roll and other substances which may possibly be in contact therewith. On the other hand, when an aqueous composition containing a copolymer having an excessively high glass transition temperature is coated on a polyester support to form a sub layer, the resulting sub layer tends to become poor in its transparency.

Non-limiting examples of copolymers preferably usable in the present invention include those of glycidyl methacrylate/hydroxyethyl methacrylate/ethyl acrylate, glycidyl methacrylate/hydroxyethyl methacrylate/styrene/n-butyl acrylate, glycidyl methacrylate/hydroxyethyl acrylate/n-butyl methacrylate, glycidyl methacrylate/hydroxyethyl methacrylate/-butadiene, glycidylmethacrylate/hydroxyethyl acrylate, glycidyl acrylate/hydroxyethyl methacrylate/ethyl acrylate, glycidyl acrylate/hydroxyethyl methacrylate/styrene/n-butyl acrylate, glycidyl acrylate/hydroxyethyl acrylate/n-butyl methacrylate, glycidyl methacrylate/hydroxyethyl methacrylate/-butadiene, glycidyl acrylate/hydroxyethyl acrylate. Though the molecular weight of the polymer used in this invention cannot be exactly determined because it has bridging structure by means of glycidyl groups, it is thought to be above 10,000, credibly over 100,000. In the present invention, the molecular weight little affects usefulness.

The copolymer used in the present invention is dispersed to finely divided particles in an aqueous dispersion medium to prepare a copolymer-containing aqueous composition which is then used as a coating liquid for the formation of sub layer. According to the purpose for which the copolymer-containing aqueous composition of the present invention, a part of water may be replaced by a water-miscible organic solvent (e.g. methanol or acetone). The copolymer of the present invention prepared by emulsion polymerization is obtained as an aqueous dispersion of particulate emulsion polymerizate, i.e. so-called latex. Preparation by emulsion polymerization of the copolymer-containing aqueous compositions of the present invention may be carried out by the following procedure. For instance, to an appropriate reaction vessel charged with deaerated distilled water are added monomers selected from the compounds hereinbefore mentioned and including at least one of the first and the second components of the present copolymer so that the fractions of monomers added may amount of about 10 to about 50 wt% of the whole contents of the reaction vessel, followed by addition thereto of suitable amounts a surface active agent for emulsion polymerization such as an anionic surface active agent or the like and a water-soluble polymerization initiator, e.g. potassium persulfate or the like. Thereafter, the mixture thus charged is heated with stirring at 50°-90° C. for several hours to undergo emulsion polymerization. Alternatively, the copolymer-containing aqueous compositions used in the present invention may also be obtained in the following manner where monomers for the first and second components and, if necessary, the third component monomer are dissolved in an appropriate solvent to prepare a solution, the resulting solution is charged with necessary amounts of a polymerization initiator and a polymerization promoter, heated and then allowed to stand for several hours, and subsequently the reaction liquid thus obtained is vigorously mixed with an aqueous solvent and a surfactant as an emulsifier.

Typical copolymers to be contained in the copolymer-containing aqueous compositions of the present invention and copolymers for comparison are illustrated below with reference to methods of preparation thereof.

PREPARATION METHOD 1

Preparation, as indicated in the following Table 1, of exemplified compounds (1)-(7) as the copolymers of the present invention and compounds (1)-(5) used as the copolymers for comparison.

To a 500 ml four-necked flask equipped with a stirrer, a reflux condenser, a temperature controllable heating apparatus, a thermometer and a dropping funnel are fed 200 ml of deaerated distilled water with 1 g of sodium dodecylbenzenesulfonate as an emulsification dispersant, and the contents of the flask are continuously stirred at a rate of 250 r.p.m. with heating while adjusting the internal temperature of the flask so as to be maintained at 60° C. Thereto are added 0.15 g of ammonium persulfate as a polymerization initiator and 0.15 g of sodium acid sulfite as a polymerization promoter and subsequently is dropwise added 1/10 of the predetermined amount of each monomer as indicated in Table 1. As soon as polymerization is initiated, the polymerization system in the flask is allowed to stand still for 10 minutes, and thereafter the remainder of each monomer is dropwise added to the system at a constant rate over a period of 50 minutes. The flask is cooled so as to maintain the internal temperature thereof always at 60° C. since heat is vigorously generated due to heat of polymerization during dropwise addition of the monomers. After completion of the addition of the monomers, the reaction is continued for additional 4 hours under the same conditions as above, whereupon the polymerization is almost over. Except for the comparative compound (5), the copolymers prepared in the above manner were obtained in each case as aqueous dispersions of emulsified polymer, of which the solids concentration was in the range of from 32 to 33 wt%, the polymerization rate was 96% or higher, and the particle size of copolymer as determined under electron microscopic observation was in the vicinity of 0.12μ. However, the comparative compound (5) was obtained as a milky white polymer latex, but the polymer latex totally precipitated when this comparative compound as prepared was allowed to stand at room temperature for 2 hours.

TABLE 1

| Copolymer (aq. dispersion) obtained by Preparation Method 1 | Monomer used | Amount of monomer added (g) (wt %) |
|---|---|---|
| Exemplified compound (1) | Glycidyl methacrylate | 60 |
| | Hydroxyethyl methacrylate | 10 |
| | Ethyl acrylate | 30 |
| Exemplified compound (2) | Glycidyl methacrylate | 40 |
| | Hydroxyethyl methacrylate | 5 |
| | n-Butyl acrylate | 55 |
| Exemplified compound (3) | Glycidyl methacrylate | 40 |
| | Hydroxyethyl methacrylate | 35 |
| | n-Butyl acrylate | 25 |
| Exemplified compound (4) | Glycidyl methacrylate | 35 |
| | Hydroxyethyl acrylate | 10 |
| | Ethyl acrylate | 55 |
| Exemplified compound (5) | Glycidyl acrylate | 40 |
| | Hydroxyethyl acrylate | 10 |
| | Styrene | 25 |
| | n-Butyl acrylate | 25 |
| Exemplified compound (6) | Glycidyl methacrylate | 60 |
| | Hydroxyethyl acrylate | 20 |
| | Vinyl acetate | 10 |
| | Ethyl acrylate | 10 |
| Exemplified compound (7) | Glycidyl methacrylate | 40 |
| | Hydroxyethyl acrylate | 10 |
| | n-Butyl methacrylate | 50 |
| Comparative compound (1) | Glycidyl methacrylate | 50 |
| | Ethyl acrylate | 50 |
| Comparative compound (2) | Hydroxyethyl acrylate | 10 |
| | Ethyl acrylate | 90 |
| Comparative compound (3) | Glycidyl methacrylate | 20 |
| | Hydroxyethyl methacrylate | 30 |
| | n-Butyl acrylate | 50 |
| Comparative compound (4) | Glycidyl methacrylate | 80 |
| | Hydroxyethyl methacrylate | 10 |
| | n-Butyl acrylate | 10 |
| Comparative compound (5) | Glycidyl methacrylate | 30 |
| | Hydroxyethyl methacrylate | 50 |
| | Styrene | 10 |
| | n-Butyl acrylate | 10 |

PREPARATION METHOD 2

Preparation, as indicated in the following Table 2, of exemplified compound (8) and comparative compound (6)

In an autoclave, 380 cc of deionized water is deaerated at ordinary temperature for 15 minutes with dry nitrogen and then charged with 20 cc of a 5% aqueous solution of sodium dodecylbenzenesulfonate and 0.25 g each of sodium hydrogensulfite and ammonium persulfate, followed by addition thereto of each monomer as indicated in Table 2. After sealing the autoclave, the water temperature is allowed to elevate while stirring to 60° C. over a period of 1 hour. Thereafter, the water temperature is maintained at 60° C. and after the internal pressure of the autoclave becomes equal to the atmosphere, the reaction is continued for additional 1 hour to obtain each title compound. The time required for completion of the reaction was about 6 hours.

TABLE 2

| Copolymer (aq. dispersion) obtained by Preparation Method 2 | Monomer used | Amound of monomer added (g) |
|---|---|---|
| Exemplified compound (8) | Glycidyl methacrylate | 65 |
| | Hydroxyethyl methacrylate | 10 |
| | Butadiene | 25 |
| Comparative compound (6) | Glycidyl methacrylate | 20 |
| | Butadiene | 80 |

The copolymer-containing aqueous compositions containing the present copolymers are preferably used in such a manner that the copolymer prepared as an aqueous dispersion according to the aforementioned Preparation Method 1 or 2 is diluted, if necessary, with water or a water-miscible organic solvent so that the solids concentration in the diluted dispersion of said copolymer may become 0.1–10 wt%, though the mode of using the present composition may vary depending on the purpose for which said composition is used and on the coating technique employed therefor. The present copolymer-containing aqueous compositions may contain a variety of additives besides the above-mentioned copolymer latex. For instance, the present copolymer-containing aqueous compositions may be incorporated, in order to improve dispersibility of polymer particles or coatability of the composition at the time of subbing treatment, or impart antistatic ability thereto or improve coatability of a photographic gelatin composition to be formed on the composition, with anionic surface active agents such as alkali metal or ammonium salts of alcohol sulfuric acid of 8 to 18 carbon atoms; ethanolamine lauryl sulfate; ethylaminolauryl sulfate; alkali metal and ammonium salts of paraffin oil; alkali metal salts of aromatic sulfonic acid such as dodecane-1-sulfonic acid, octadiene-1-sulfonic acid or the like; alkali metal salts such as sodium isopropylbenzene-sulfate, sodium isobutylnaphthalenesulfate or the like; and alkali metal or ammonium salts of esters of sulfonated dicarboxylic acid such as sodium dioctylsulfosuccinate, disodium dioctadecylsulfosuccinate or the like; nonionic surface active agents such as sorbitan alkyl esters, polyethyle oxides, polyoxyethylene alkyl ethers or the like; cationic surface active agents such as octadecyl ammonium chloride, trimethyldosecyl ammonium chloride or the like; and high molecular surface active agents other than those above mentioned such as polyvinyl alcohol, partially saponified vinyl acetates, maleic acid containing copolymers, gelatin or the like. Further, additives which may be incorporated into the present aqueous composition include inorganic matting agents such as titanium oxide, silicon oxide, colloid silica, zinc oxide, aluminum oxide, etc., matting agents comprising particles of polymers such as polymethyl methacrylate, etc., antistatic agents comprising inorganic salts or copolymers having maleic acid derivatives in the main chain as disclosed in Japanese Patent Publications Nos. 24158/1971, 24159/1971 and 23828/1974, and, according to the purpose for which the present aqueous composition is used, dyes or pigments for coloring purposes and alkali or acid for adjusting a pH value of the present copolymer-containing aqueous composition. Furthermore, the present aqueous compositions may also be incorporated, according to the purpose for which they are used, with hardeners aldehyde group-containing compounds such as formaldehyde, glyoxal, etc., ethyleneimino group-containing compounds such as tetramethylene-1,4-bis(ethyleneurea), hexamethylene-1,6-bis(ethyleneurea), etc., esters of methane-sulfonic acid such as trimethylenebis methanesulfonic acid ester, etc., active vinyl compounds such as bisacroyl urea, metaxylenedivinylsulfonic acid, etc., epoxy group-containing compounds such as bisphenolglycidyl ether, etc., and isocyanates. It is also possible to use swelling agents or solvents for polyester such as phenol, resorcinol, etc., though the use of these additives is not necessary in the case of the present invention. Further a water-miscible organic solvents which do not effect as swelling agents or solvents for polyester, for example, methanol, ethanol or acetone, may be added.

The copolymer-containing aqueous composition of the present invention is usually coated and dried on a polyester support at a coverage of approximately 0.05 to 5 g of polymer solids per 1 $m^2$ of support, and in this case the conventional sub layer coating technique is applicable, for example, dip coating, roll coating, spray coating or the like. After coating the support may be heated over 60° C., generally 100° to 150° C.

By polyester supports used for obtaining the subbed polyester support according to the present invention are meant film-like supports prepared by subjecting a polyester compound, the representative of which is polyethylene terephthalate, which is obtained, for example, by condensation polymerization of diol and a dicarboxylic acid containing compound, to extrusion molding to prepare a film and crystallizing the resulting film by biaxial stretching and thermal setting.

Before coating the above-mentioned polyester support with the copolymer-containing aqueous composition of the present invention, it is preferable to subject the surface of said polyester support beforehand to surface treatment including such electron bombardment as corona discharge, ultraviolet irradiation, or flame treatment. In some cases, moreover, it is preferable to subject the surface of the sub layer formed on a polyester support by coating said support with the copolymer-containing aqueous composition of the present invention to such surface treatment as mentioned above, because film adhesion between the thus treated sub layer surface and a photographic hydrophilic colloid layer to be formed thereon. Furthermore, a polyester support subjected to surface treatment may be coated with the present subbing composition to form a sub layer thereon and then the surface of the sub layer thus formed may be further subjected to surface treatment. In this case, corona discharge treatment is advantageously used as the surface treatment, because practical effect of the treatment can be obtained and an apparatus necessary therefor is available at low cost.

If necessary, for example for blocking inhibiting or antistatic purposes, the polyester support subbed with the copolymer-containing aqueous composition of the present invention may be coated on the sub layer with one other sub layer as a second sub layer so long as no deterioration in subbing characteristics of the present subbed polyester support is brought about. Subbing compositions usable for forming the second sub layer in this case include such hydrophilic high molecular substance or gelation as disclosed in Japanese Patent Publication No. 24159/1971, Japanese Laid-Open-to-Public Poblication No. 91165/1973 and Japanese Patent Publication No. 23828/1974. The second sub layer, if formed in the above manner, may also be incorporated according to the purpose with the above-mentioned additives such as surface active agents, matting agents, hardeners, dyes, pigments, alkali, acid and salts. Further, the surface of the second sub layer may also be subjected to surface treatment as aforesaid.

The polyester support of the present invention provided with a sub layer or sub layers in the manner hereinbefore illustrated may be coated according to the conventional procedure with a photographic hydrophilic colloid layer. Concretely speaking, the subbed polyester support obtained according to the present invention can be coated with a variety of compositions for forming photographic photosensitive layers, for example, silver halide photographic emulsions, diazo photosensitive compositions, etc. or gelatin compositions containing antihalation agents or helatin backing compositions for favorably retaining curl balance of support film. Light-sensitive photographic materials obtained by the use of the subbed polyester supports of the present invention are excellent in both dry and wet film adhesion characteristics, and photographic photosensitive layers do not peel off from the supports at all and no adverse effect on photographic properties is brought about.

The present invention is concretely illustrated below with reference to examples, but it should be construed that embodiments of the invention are not limited only to those examples.

EXAMPLE 1

A subbing aqueous dispersion consisting of the copolymer-containing aqueous composition of the present invention was prepared by diluting the aforesaid exemplified compound (1) with water so that the solids concentration of said exemplified compound in the diluted liquid became 2%, and incorporating saponin and silica particles having a particle diameter of from 1 to 5μ into said diluted liquid so that amounts of said saponin and said silica particles became 1.5 wt% and 0.01 wt%, respectively, based on the solids of said exemplified compound.

This dispersion was coated by means of a double roll coater on a biaxially stretched polyethylene terephthalate film (180μ in thickness) so that the resulting coating of the dispersion after drying became 27μ in thickness and then dried at 120° C. for 30 minutes to form a sub layer on the film support. The sub layer of the polyethylene terephthalate support film subjected to subbing treatment in the above manner was found favorable in its transparency and free of cracking of the layer.

Subsequently a silver halide photographic emulsion containing silver iodobromide for use in X-ray film was coated on the sub layer of the support thus treated and then dried to prepare a sample of a light-sensitive silver halide material for X-ray photography. The sample thus obtained was subjected to dry film adhesion test and wet film adhesion test, respectively, in the manner as mentioned below.

[Dry film adhesion test]

The emulsion layer of the sample was cross cut with a razor to such an extent that each cut may reach to the film support surface and then an adhesive tape (e.g. a cellophane sticky tape) of a predetermined area was applied to stick on the cross-cut emulsion layer surface. Thereafter, the adhesive tape thus stuck was suddenly peeled off from the cross-cut emulsion layer surface to observe whether or not the cross-cut emulsion layer remained on the support. The result was represented by a ratio (percent area) of the cross-cut emulsion layer remained, within the area to which the adhesive tape had been applied, on the support to the area of the cross-cut emulsion layer to which the adhesive tape had been applied, a value of said ratio being indicated in terms of percentage. Accordingly, if a value as obtained is 100%, no peeling of the cross-cut emulsion layer is observed at all and a very strong adhesion (adhesion between the emulsion layer and the support) can be recognized to have been attained, whereas if this value is 0%, it means that the emulsion layer within the area to which the adhesive tape has been applied totally peeled off from the support. Thus, the larger is the value as measured, the more excellent is the adhesion between the substance to be coated on the support and said support. In this connection, no practical problem arises if this value as measured is larger than about 80%.

[Wet film adhesion test]

The emulsion layer of the sample, while being immersed in a processing liquid, was cross cut with a gimlet-like sharp point of metal bar in the manner similar to that of the dry film adhesion test and the cross-cut emulsion layer surface was rubbed with a finger to observe whether or not the rubbed emulsion layer peeled off from the support. The result was represented by a ratio (%) of the area of the emulsion layer remaining within the rubbed area on the support to the whole rubbed area of the emulsion. Accordingly, the larger is the value of this ratio as measured, the better is the wet film adhesion as attained. No practical problem arises if the value as measured is larger than 80%.

As the result, the sample prepared according to the present invention was found to have a value of 100% as measured in the dry film adhesion test as well as in the wet film adhesion test.

Furthermore, the sample of the present invention was subjected to edge peel test in the following manner to find that no edge peel was observed at all and good results were obtained.

[Edge peel test]

The emulsion layer of the sample in a wet state and under treatment with a developer and a fixer was stronly rubbed at the edge portion thereof at right angles with a soft rubber inwardly in the horizontal direction to observe whether or not the emulsion layer peeled off from the support. In evaluating the test results, an instance where the emulsion layer peeled off from the support even to a slight extent was graded "bad" and a grade of "good" was given to an instance where no peeling-off of the emulsion was observed at all.

Comparative Example 1

An aqueous dispersion for subbing was prepared by diluting the aforesaid comparative compound (1) with water so that the solids concentration of said comparative compound in the diluted liquid became 2%, followed by addition thereto of saponin and silica particles having a particle diameter of 1 to 5μ in such a manner that amounts of the saponin and silica particles became 1.5 wt% and 0.01 wt%, respectively, based on the solids of said comparative compound.

The dispersion thus prepared was coated with a double roll coater on a biaxially atretched polyethylene terephthalate film (180μ in thickness) so as to attain a thickness of 27μ and then dried at 120° C. for 30 minutes.

The subbed polyethylene terephthalate support thus prepared was found to be favorable in transparency of the sub layer formed thereon. However, this subbed support was coated with a silver halide photographic emulsion for X-ray photography in the same manner as in Example 1 to prepare a sample, and the sample thus prepared was then subjected to film adhesion tests in the same procedure as in Example 1 to find that measured values of 5% and 50% were obtained in the dry and wet film adhesion tests respectively.

Subsequently, the subbed polyethylene terephthalate support prepared in the above manner was coated on the sub layer with a subbing liquid of the following composition by means of a double roll coater to form a second sub layer and then dried for 3 minutes with hot air kept at 100° C. to prepare a sample.

[Composition of second sub layer]

| | |
|---|---|
| Snowtex 20 (colloid silica manufactured and sold by Nissan Kagaku Kogyo K.K.) | 10 ml |
| Gelatin | 0.3 g |
| Sodium di-n-octylbenzenedodecylsulfonate | 0.02 g |
| Water | 90 ml |

The sample thus prepared was visually observed to find that the whole surface of the subbed support looked turbid white, and microscopic observation revealed the formation of cracks in the sub layer. Subsequently, this sample was coated with a silver halide photographic emulsion in the similar manner to prepare a sample, and the sample thus prepared was subjected likewise to film adhesion tests to find that practically favorable adhesion characteristics were demonstrated with measured values of 80% and 90% obtained in the dry and wet film adhesion tests respectively.

EXAMPLE 2

A biaxially stretched polyethylene terephthalate film (about 180μ in thickness) was subjected to surface treatment by means of corona discharge technique. This corona discharge treatment was conducted with a corona discharge apparatus manufactured by Kasuga Electric K.K. under the conditions calling for a film travelling speed of 10 m/min, a space of 0.3 mm between electrodes and a plate voltage of 25 KV.

The film thus subjected to surface treatment was coated with a subbing aqueous dispersion prepared by diluting each of the aforesaid exemplified compounds (2)-(6) so as to attain the solids concentration of each exemplified compound of 2 wt%, followed by addition thereto of 0.01 wt% of particulate polymethyl methacrylate having a particle diameter of 1 to 5μ to form a sub layer and then dried at 120° C. for 3 minutes. Each of the samples thus prepared was found to be favorable in transparency of the sub layer.

The samples thus prepared were individually coated with a silver halide emulsion containing silver iodobromide for X-ray photography, a lith type silver halide photographic emulsion containing silver chlorobromide and a backing gelatin layer for sheet film, respectively, to prepare samples, and the samples thus prepared were subjected to film adhesion tests in the same procedure as in Example 1.

For comparison, on the other hand, samples were prepared in the same manner as above, except that comparative compounds (2)-(4) were used in place of the above-mentioned exemplified compounds, to prepare samples, and the comparative samples thus prepared were subjected likewise to film adhesion tests. The results obtained in the tests of the present samples and comparative samples were as shown in Table 3.

TABLE 3

| | Emulsion for X-ray | | | Lith type emulsion | | | Backing layer for color sheet | | | Trans-parency of sub layer |
|---|---|---|---|---|---|---|---|---|---|---|
| | Film adhesion | | Edge peel | Film adhesion | | Edge peel | Film adhesion | | Edge peel | |
| Sub layer | Dry | Wet | | Dry | Wet | | Dry | Wet | | |
| Exemplified compound (2) | 100 | 100 | Good | 100 | 100 | Good | 100 | 100 | Good | Good |
| Exemplified compound (3) | 100 | 90 | Good | 100 | 100 | Good | 100 | 100 | Good | Good |
| Exemplified compound (4) | 100 | 100 | Good | 100 | 100 | Good | 90 | 100 | Good | Good |
| Exemplified compound (5) | 100 | 100 | Good | 95 | 100 | Good | 90 | 100 | Good | Good |
| Exemplified compound (6) | 100 | 100 | Good | 100 | 100 | Good | 100 | 100 | Good | Good |
| Comparative compound (2) | 75 | 5 | Bad | 70 | 30 | Bad | 50 | 10 | Bad | Good |
| Comparative compound (3) | 70 | 10 | Bad | 60 | 15 | Bad | 60 | 15 | Bad | Good |
| Comparative compound (4) | 10 | 50 | Bad | 15 | 75 | Good | 20 | 60 | Good | Good |

As is clear from Table 3, it is understood that satisfactory performances are exhibited in each of the samples prepared according to the present invention as evidenced by favorable transparency of the sub layer, sufficient film adhesion force between the support and each of three kinds of photographic hydrophilic colloid layers (containing gelatin compositions) and favorable resistance to edge peel. On the other hand, the comparative samples, though favorable in transparency in the sub layer, are insufficient in film adhesion force and edge peel is observed in almost of the samples.

EXAMPLE 3

A biaxially stretched polyethylene terephthalate film (180μ in thickness) was subjected to corona discharge treatment in the same manner as in Example 2. A subbing aqueous dispersion was prepared by diluting the aforesaid exemplified compound (7) with a mixture of water and methanol in a volume ratio of 9:1. so that the solids concentration of said exemplified compound became 2% (by weight). The support treated as above was coated with the subbing aqueous dispersion obtained above by means of a double roll coater to form a sub layer having a thickness of 27μ, and then dried at 120° C. for 3 minutes. The sub layer thus formed was subjected to corona discharge treatment under the same conditions as in Example 2, and the thus treated sub layer was coated each of the three kinds of photographic hydrophilic colloid layers, respectively, and then dried to obtain samples. The samples thus prepared were subjected to the same film adhesion teats and edge peel test as in Example 1.

On the other hand, comparative samples were prepared in the same manner as above, except that comparative compound (2) was used in place of the above-mentioned exemplified compound (7), and then subjected to tests in the same procedure as above. The results obtained in the tests of the present samples and comparative samples were as shown in Table 4.

TABLE 4

| | Emulsion for X-ray | | | Lith type emulsion | | | Backing layer for color sheet | | |
|---|---|---|---|---|---|---|---|---|---|
| | Film adhesion | | Edge | Film adhesion | | Edge | Film adhesion | | Edge |
| Sub layer | Dry | Wet | peel | Dry | Wet | peel | Dry | Wet | peel |
| Exemplified compound (7) | 100 | 100 | Good | 100 | 100 | Good | 100 | 100 | Good |
| Comparative compound (2) | 50 | 70 | Bad | 60 | 80 | Good | 20 | 70 | Good |

As is clear from Table 4, it is understood that the samples prepared according to the present invention are excellent in film adhesion force, resistance to edge peel and favorable in transparency of the sub layer. In contrast thereto, the comparative samples fail to exhibit film adhesion force sufficient for practical use.

EXAMPLE 4

A biaxially stretched polyethylene terephthalate film (180μ in thickness) was subjected to corona discharge treatment in the same manner as in Example 2, and the support thus treated was coated to form a sub layer thereon by means of a double roll coater with a subbing aqueous dispersion prepared by diluting the aforesaid exemplified compound (8) with water to make 100 cc of a diluted liquid so that the solid content of said exemplified compound in said liquid became 5 g, followed by addition thereto of 0.2 g of hexamethylene-1,6-bis-(ethyleneurea), and the sub layer came to have a thickness of 27μ, and then dried at 120° C. for 3 minutes. On the sub layer thus formed was coated by means of a double roll coater a second subbing liquid comprising 0.5 g of gelatin, 0.01 g of silicon oxide of a particle diameter of 0.5 to 5μ and 0.02 g of sodium dodecane-1-sulfonate in 100 cc of water to form a second sub layer having a thickness of 15μ, and then dried at 100° C. for 1 minute. The support thus treated was coated with the same three kinds of photographic hydrophilic colloid layers as in Example 2, respectively, and then dried to prepare samples. The samples thus prepared were subjected to film adhesion tests and edge peel test in the same procedure in Example 1.

On the other hand, samples for comparison were prepared in the same manner as above, except that comparative compound (6) was used in place of the exemplified compound (8), and the comparative samples thus prepared were subjected likewise to the tests. The results obtained in the film adhesion tests and edge peel test were as shown in Table 5.

TABLE 5

| | Emulsion for X-ray | | | Lith type emulsion | | | Backing layer for color sheet | | |
|---|---|---|---|---|---|---|---|---|---|
| | Film adhesion | | Edge | Film adhesion | | Edge | Film adhesion | | Edge |
| Sub layer | Dry | Wet | peel | Dry | Wet | peel | Dry | Wet | peel |
| Exemplified compound (8) | 100 | 100 | Good | 100 | 100 | Good | 100 | 100 | Good |
| Comparative compound (6) | 75 | 20 | Bad | 70 | 60 | Bad | 50 | 50 | Bad |

As is clear from Table 5, it is understood that the samples prepared according to the present invention also exhibit excellent subbing affects in case the subbed polyethylene terephthalate film support has been further provided with the second sub layer in the above manner.

What we claim is:

1. A photographic polyester support having an adjacent sub layer containing a copolymer consisting essentially of (1) 30–70 wt% glycidyl acrylate and/or glycidyl methacrylate monomer, (2) 3–45 wt% hydroxyalkyl acrylate having an alkyl group of 2 to 4 carbon atoms and/or hydroxyalkyl methacrylate monomer, and (3) 0–67 wt% copolymerizable vinyl monomer.

2. A photographic polyester support according to claim 1 wherein the copolymer consisting essentially of (1) 30–70 wt% glycidyl acrylate and/or glycidyl methacrylate monomer, (2) 4–40 wt% hydroxyalkyl acrylate having an alkyl group of 2 to 4 carbon atoms and/or hydroxyalkyl methacrylate monomer, and (3) 0–67 wt% copolymerizable vinyl monomer.

3. A photographic polyester support according to claim 1 wherein the copolymer consisting essentially of (1) 35–65 wt% glycidyl acrylate and/or glycidyl methacrylate monomer, (2) 3–45 wt% hydroxyalkyl acrylate having an alkyl group of 2 to 4 carbon atoms and/or hydroxyalkyl methacrylate monomer, and (3) 0–67 wt% copolymerizable vinyl monomer.

4. A photographic polyester support according to claim 3 wherein the copolymer consisting essentially of (1) 35–65 wt% glycidyl acrylate and/or glycidyl methacrylate monomer, (2) 4–40 wt% hydroxyalkyl acrylate having an alkyl group of 2 to 4 carbon atoms and/or hydroxyalkyl methacrylate monomer, and (3) 0–67 wt% copolymerizable vinyl monomer.

5. A photographic polyester support having an adjacent sub layer containing a copolymer consisting essentially of (1) 30–70 wt% glycidyl acrylate and/or glycidyl methacrylate monomer, (2) 3–45 wt% hydroxyalkyl acrylate having an alkyl group of 2 to 4 carbon atoms and/or hydroxyalkyl methacrylate monomer, and (3) 0–67 wt% copolymerizable vinyl monomer, wherein said copolymer has a glass transition point ranging from −30° C. to 40° C.

6. A method for subbing a photographic polyester support comprising coating an aqueous copolymer composition onto said support, wherein the aqueous copolymer composition contains a copolymer consisting essentially of (1) 30–70 wt% glycidyl acrylate and/or glycidyl methacrylate monomer, (2) 3–45 wt% hydroxyalkyl acrylate having an alkyl group of 2 to 4 carbon atoms and/or hydroxy methacrylate monomer, and (3) 0–67 wt% copolymerizable vinyl monomer.

7. A method according to claim 6 wherein the aqueous copolymer composition contains further a surface active agent.

8. A method according to claim 6, wherein the photographic polyester support is a polyethylene terephthalate film.

9. A method according to claim 8 wherein the photographic polyester support is a biaxially stretched polyethylene terephthalate film.

* * * * *